(12) United States Patent
Coscarella

(10) Patent No.: US 9,097,363 B2
(45) Date of Patent: Aug. 4, 2015

(54) LOW PROFILE BACKWATER VALVE WITH LOCK

(76) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 13/818,088

(22) PCT Filed: Aug. 20, 2010

(86) PCT No.: PCT/CA2010/001268
§ 371 (c)(1),
(2), (4) Date: May 1, 2013

(87) PCT Pub. No.: WO2012/021961
PCT Pub. Date: Feb. 23, 2012

(65) Prior Publication Data
US 2013/0220448 A1 Aug. 29, 2013

(51) Int. Cl.
F16K 31/18 (2006.01)
F16K 15/03 (2006.01)
F16K 21/18 (2006.01)
(Continued)

(52) U.S. Cl.
CPC . *F16K 31/22* (2013.01); *E03F 7/04* (2013.01); *F16K 15/03* (2013.01); *F16K 15/181* (2013.01); *F16K 31/18* (2013.01); *Y10T 137/7256* (2015.04)

(58) Field of Classification Search
CPC ......... F16K 31/18; F16K 31/22; F16K 15/03; F16K 15/181; E03F 7/04; Y10T 137/7256
USPC ................. 137/410, 456, 448, 521, 529, 527, 137/527.6, 527.8
See application file for complete search history.

(56) References Cited

U.S. PATENT DOCUMENTS

| 194,676 A | 8/1877 | Hansen |
| 199,696 A | 1/1878 | Dikeman |

(Continued)

FOREIGN PATENT DOCUMENTS

| CA | 2 114 602 C | 7/1997 |
| CA | 2 302 455 A1 | 3/2000 |
| CA | 2 640 496 A1 | 4/2010 |

OTHER PUBLICATIONS

"Adapt-A-Valve," Apr. 12, 2009, Backwater Valves, Akron, Ohio, <http://replay.waybackmachine.org/20090412082842/http://www.backwater-valves.com/Adapt-A-Valve.asp> [retrieved Apr. 12, 2011], 3 pages.

(Continued)

*Primary Examiner* — Craig Schneider
*Assistant Examiner* — Frederick D Soski
(74) *Attorney, Agent, or Firm* — Christensen O'Connor Johnson Kindness PLLC

(57) ABSTRACT

A low profile backwater valve includes a hollow valve body having an inlet, an outlet, a top and a bottom. A pivoting valve member that is buoyant in water moves between a normally open position along the bottom of the valve body and a closed position sealing the inlet. A locking member is positioned in the hollow valve body. The locking member has a release position below the pivot axis of the valve member that permits the valve member to pivot freely, and a locking position immediately adjacent to the valve member that secures the valve member in the closed position. A handle is attached to the locking member and is accessible from outside and from the top of the hollow valve body. The handle moves the locking member between the release position and the locking position.

3 Claims, 4 Drawing Sheets

(51) Int. Cl.
  *F16K 31/22* (2006.01)
  *E03F 7/04* (2006.01)
  *F16K 15/18* (2006.01)

(56) References Cited

U.S. PATENT DOCUMENTS

| | | | |
|---|---|---|---|
| 217,431 A | 7/1879 | Tilton | |
| 271,644 A | 2/1883 | Lowrie | |
| 289,108 A | 11/1883 | Johnson | |
| 371,085 A * | 10/1887 | McGary | 137/445 |
| 384,396 A | 6/1888 | Shepherd | |
| 384,397 A | 6/1888 | Shepherd | |
| 424,580 A | 4/1890 | Sheperd | |
| 500,453 A | 6/1893 | Wright | |
| 876,066 A * | 1/1908 | Klever | 137/521 |
| 961,738 A * | 6/1910 | Stickel | 137/270 |
| 1,031,567 A | 7/1912 | Miller | |
| 1,113,648 A | 10/1914 | Karlson | |
| 1,183,692 A | 5/1916 | Strout | |
| 1,205,199 A | 11/1916 | Healy | |
| 1,233,391 A * | 7/1917 | Mullane et al. | 251/274 |
| 1,346,887 A * | 7/1920 | Heald | 137/315.22 |
| 1,448,898 A | 3/1923 | Zehringer | |
| 1,464,614 A | 8/1923 | Nacey | |
| 1,584,666 A | 5/1926 | Shockley | |
| 1,606,396 A | 11/1926 | Blom | |
| 1,612,195 A | 12/1926 | Kirchhan | |
| 1,673,619 A | 6/1928 | Culp | |
| 1,692,127 A * | 11/1928 | Keon | 405/127 |
| 1,770,637 A | 7/1930 | Wagner | |
| 1,795,669 A | 3/1931 | Northrop | |
| 1,861,397 A | 5/1932 | Khun | |
| 1,864,443 A | 6/1932 | Khun | |
| 1,924,498 A | 8/1933 | House | |
| 2,001,941 A * | 5/1935 | Rowe et al. | 137/486 |
| 2,013,188 A | 9/1935 | Reinhardt | |
| 2,048,088 A | 7/1936 | Wagner | |
| 2,266,930 A | 12/1941 | Watson | |
| 2,290,461 A | 7/1942 | Young | |
| 2,292,509 A | 8/1942 | Carson | |
| 2,303,808 A * | 12/1942 | Wolcott | 210/119 |
| 2,504,006 A * | 4/1950 | Davis | 251/82 |
| 2,578,076 A | 12/1951 | Kirby | |
| 2,628,056 A | 2/1953 | Fuller | |
| 2,638,178 A | 5/1953 | McRill | |
| 2,695,072 A | 11/1954 | Hauslein | |
| 2,846,181 A * | 8/1958 | Orelind et al. | 251/259 |
| 2,877,792 A | 3/1959 | Tybus | |
| 2,928,410 A | 3/1960 | Vecchio | |
| 3,074,427 A | 1/1963 | Wheeler, Jr. | |
| 3,078,867 A * | 2/1963 | McGillis et al. | 137/416 |
| 3,176,707 A | 4/1965 | Wilson | |
| 3,244,194 A * | 4/1966 | Henry | 137/460 |
| 3,270,770 A | 9/1966 | Wilson | |
| 3,307,633 A * | 3/1967 | Newall | 169/22 |
| 3,327,732 A | 6/1967 | Deve | |
| 3,395,721 A | 8/1968 | Shibata | |
| 3,446,237 A * | 5/1969 | Haley | 137/463 |
| 3,448,465 A | 6/1969 | Pierce | |
| 3,538,514 A | 11/1970 | Schimert | |
| 3,565,099 A * | 2/1971 | Huber | 137/269.5 |
| 3,566,500 A | 3/1971 | Simon | |
| 3,626,148 A | 12/1971 | Woytowich | |
| 3,626,521 A | 12/1971 | Delco | |
| 3,781,920 A | 1/1974 | Browne | |
| 3,797,811 A | 3/1974 | Jullien | |
| 3,824,629 A | 7/1974 | Shiley | |
| 3,828,982 A | 8/1974 | Steigerwald | |
| 3,933,444 A | 1/1976 | Kilgore | |
| 3,948,282 A | 4/1976 | Yano | |
| 3,959,828 A | 6/1976 | Acevedo | |
| 3,974,654 A * | 8/1976 | Mirto, Jr. | 405/127 |
| 4,022,421 A * | 5/1977 | Carlin | 251/74 |
| 4,064,902 A | 12/1977 | Swenson | |
| 4,117,860 A * | 10/1978 | Carlin | 137/513.5 |
| 4,311,163 A | 1/1982 | Langevin | |
| 4,314,583 A | 2/1982 | Peterson | |
| 4,324,506 A | 4/1982 | Steinke | |
| 4,391,289 A | 7/1983 | Adams | |
| 4,475,571 A | 10/1984 | Houston, Jr. | |
| 4,477,051 A * | 10/1984 | Ben-Yehuda | 251/30.01 |
| 4,503,881 A | 3/1985 | Vecchio | |
| 4,544,027 A | 10/1985 | Goldberg | |
| 4,605,031 A | 8/1986 | Gründ | |
| 4,787,103 A | 11/1988 | Endo | |
| 4,844,610 A | 7/1989 | North, Jr. | |
| 4,891,994 A | 1/1990 | Barba | |
| 4,942,898 A | 7/1990 | Osowski | |
| 4,961,444 A | 10/1990 | Morgan | |
| 5,020,567 A | 6/1991 | Proulx | |
| 5,123,444 A | 6/1992 | Persson | |
| 5,234,018 A | 8/1993 | Grachal | |
| 5,398,722 A * | 3/1995 | Ramsey | 137/587 |
| 5,398,735 A | 3/1995 | Lagache | |
| 5,406,972 A * | 4/1995 | Coscarella et al. | 137/315.08 |
| 5,469,881 A | 11/1995 | Phan | |
| 5,622,205 A * | 4/1997 | Petersen | 137/527.8 |
| 5,669,405 A | 9/1997 | Engelmann | |
| 5,794,655 A * | 8/1998 | Funderburk et al. | 137/527 |
| 5,819,791 A | 10/1998 | Chronister | |
| 5,826,609 A | 10/1998 | Watts | |
| 5,934,313 A | 8/1999 | Brothers | |
| 5,947,152 A | 9/1999 | Martin | |
| 6,029,684 A | 2/2000 | Watts | |
| 6,068,057 A * | 5/2000 | Beukema | 169/22 |
| 6,125,878 A | 10/2000 | Watts | |
| 6,186,164 B1 | 2/2001 | Pfeifer | |
| 6,318,404 B2 | 11/2001 | Coscarella | |
| 6,446,665 B2 | 9/2002 | Coscarella | |
| 6,499,503 B2 | 12/2002 | Coscarella | |
| 6,666,277 B2 * | 12/2003 | Reilly | 169/16 |
| 6,679,283 B1 | 1/2004 | Coscarella | |
| 7,942,606 B2 | 5/2011 | Schafer | |
| 2001/0023706 A1 * | 9/2001 | Coscarella | 137/420 |
| 2001/0023707 A1 * | 9/2001 | Coscarella | 137/420 |
| 2001/0023708 A1 * | 9/2001 | Coscarella | 137/527.8 |
| 2001/0035648 A1 * | 11/2001 | Coscarella | 285/148.11 |
| 2004/0007265 A1 * | 1/2004 | Coscarella | 137/315.41 |
| 2008/0083464 A1 * | 4/2008 | Shimizu et al. | 137/527 |
| 2008/0128026 A1 * | 6/2008 | Ringer | 137/12 |
| 2010/0078083 A1 * | 4/2010 | Coscarella | 137/527 |

OTHER PUBLICATIONS

"Backwater Valve: Flapper Type," Product No. Z1091, Specification Sheet, Rev. A., Zurn Industries Inc., Erie, Penn., Oct. 30, 2003, 1 page.

International Search Report mailed Apr. 28, 2011, issued in corresponding International Application No. PCT/CA2010/001268, filed Aug. 20, 2010, 3 pages.

* cited by examiner

LOW PROFILE BACKWATER VALVE WITH LOCK

FIELD

The present invention relates to a backwater valve used to prevent a backflow of sewage into a home that has a lock.

BACKGROUND

Canadian patent application no. 2,640,496 (Coscarella) relates to a low profile backwater valve that prevents a backflow of sewage into a home.

SUMMARY

There is provided a low profile backwater valve, comprising a hollow valve body having an inlet, an outlet, a top and a bottom. A pivoting valve member is pivotally movable between a normally open position along the bottom of the valve body and a closed position sealing the inlet. The valve member has a hinge end that pivots about a pivot axis toward the bottom of the hollow valve body, a remote end, and opposed sides. The valve member is buoyant in water. The low profile backwater valve is characterised in that: a locking member is positioned in the hollow valve body, the locking member having a release position below the pivot axis of the valve member that permits the valve member to pivot freely, and a locking position immediately adjacent to the valve member that secures the valve member in the closed position; and a handle is attached to the locking member and accessible from outside and from the top of the hollow valve body, the handle moving the locking member between the release position and the locking position.

According to another aspect, the locking member may be received in a channel in an inner surface of the hollow valve body in the release position. Connectors may connect the handle to the locking member, the connectors being received in channels in an inner surface of the hollow valve body, the channels acting as guides to guide the locking member between the release position and the locking position.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
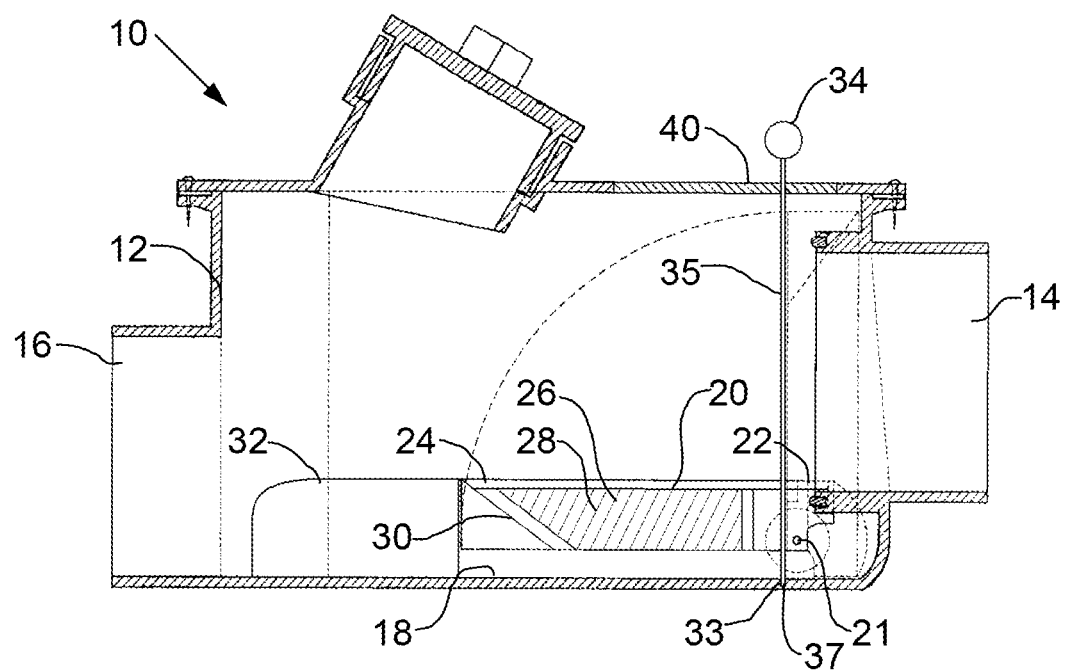
FIG. 1 is a side elevation view in section of a low profile backwater valve with a lock in a release position.

A low profile backwater valve generally identified by reference numeral 10 will now be described with reference to FIG. 1 through 6.

Figure 2:
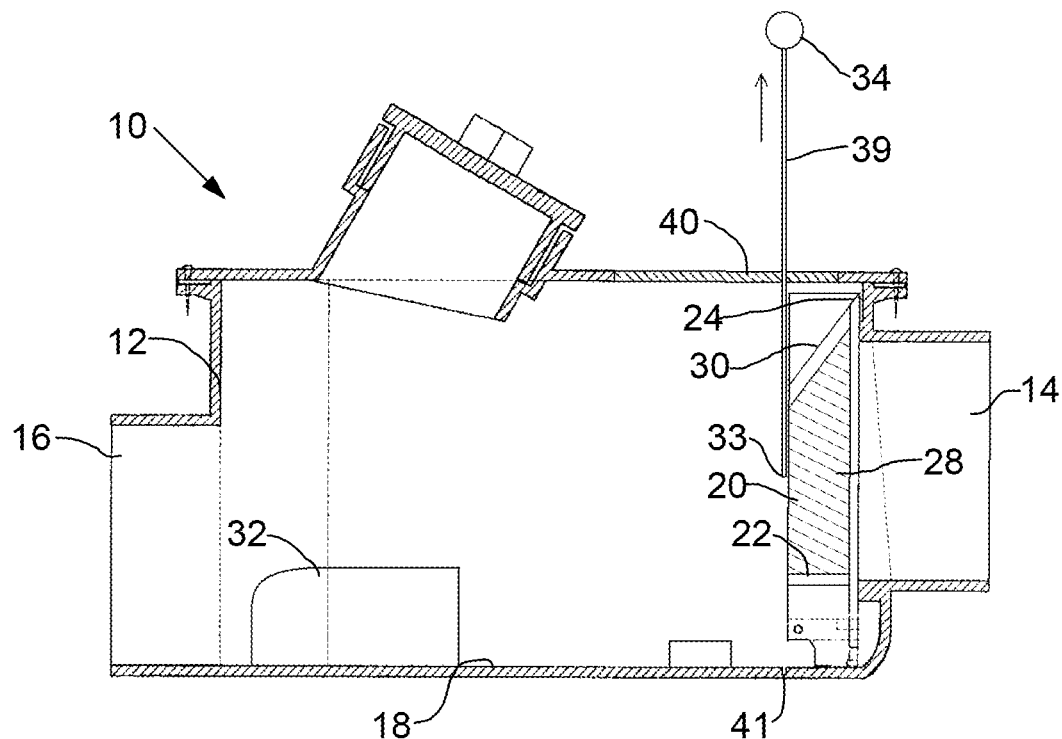
FIG. 2 is a side elevation view in section of a low profile backwater valve with a lock in a locked position.
Figure 3:
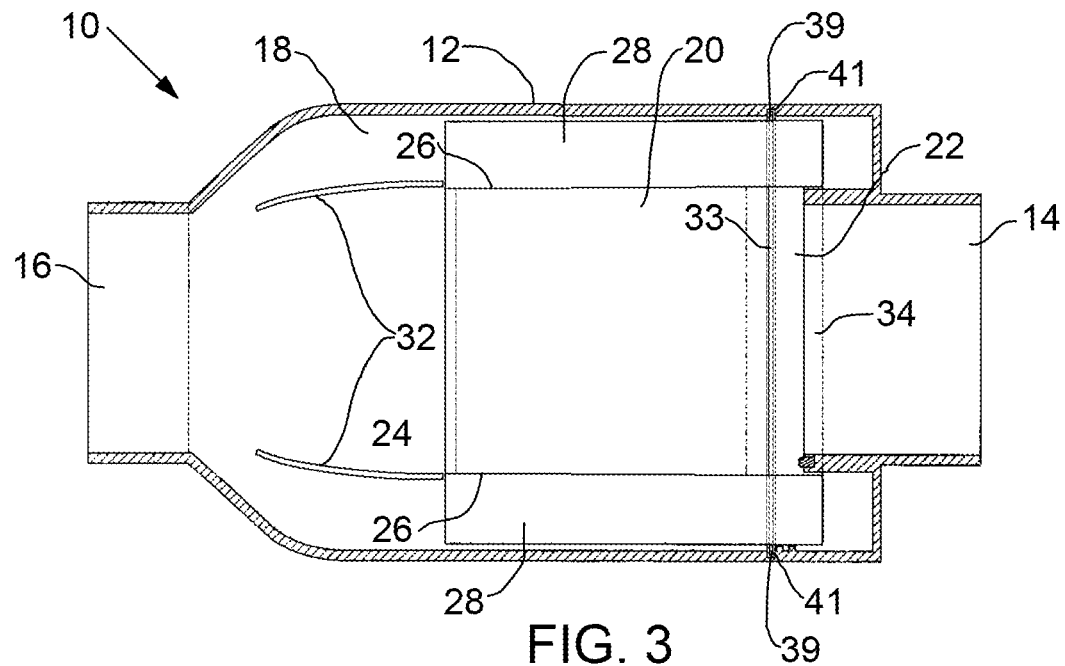
FIG. 3 is a top plan view in section of the low profile backwater valve with a lock in the release position.
Figure 6:
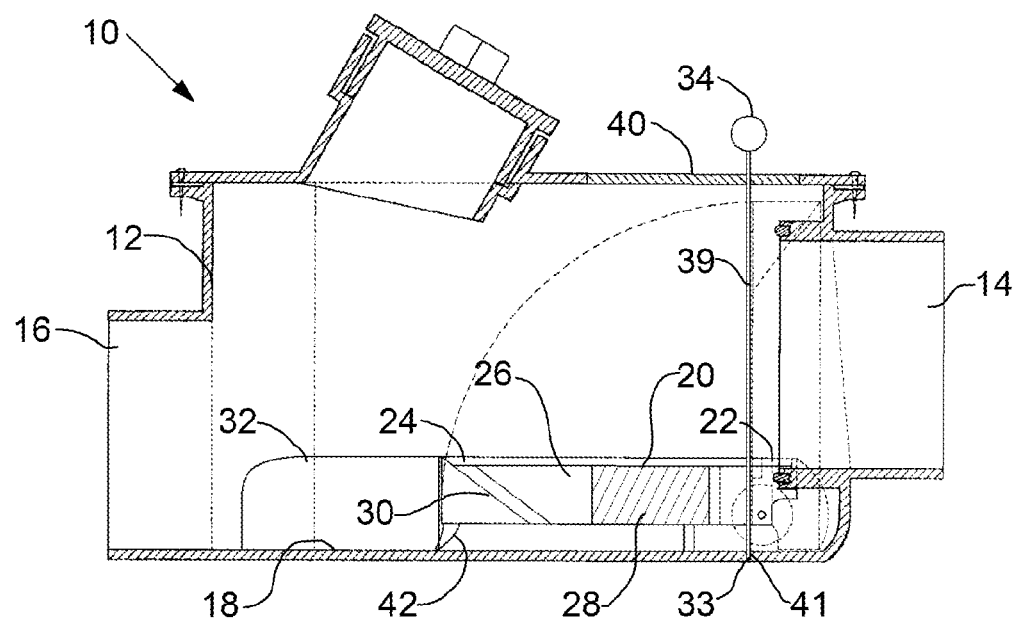
FIG. 6 is a side elevation view in section of a further variation of the low profile backwater valve.
Figure 7:
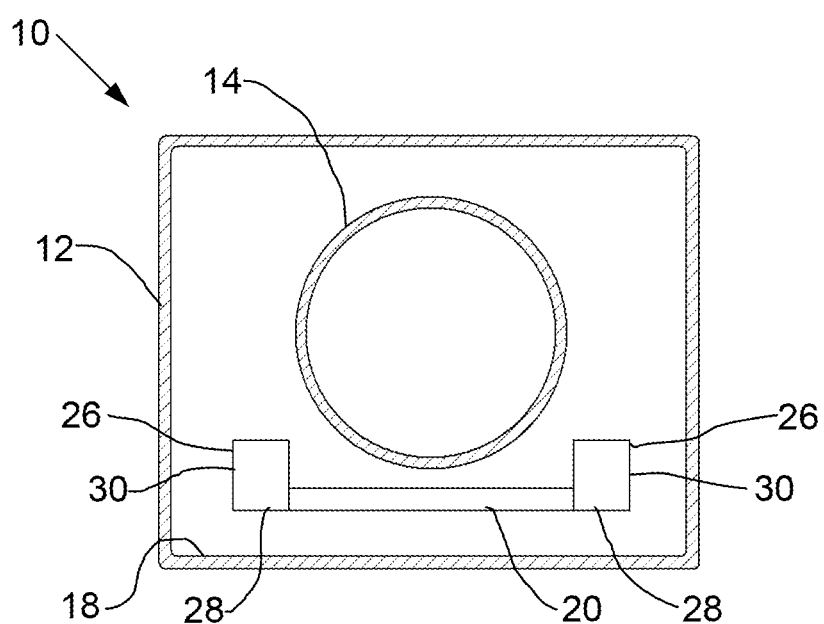
FIG. 7 is an end elevation view in section of the low profile backwater valve.

Structure and Relationship of Parts:

Referring to FIG. 1, low profile backwater valve 10 has a hollow valve body 12 having an inlet 14, an outlet 16, and a bottom 18. A pivoting valve member 20 is pivotally movable about a pivot axis 21 between a normally open position along bottom 18 of valve body 12 and a closed position sealing inlet 14 as shown in FIG. 2. Valve member 20 has a hinge end 22, a remote end 24, and opposed sides 26. A float 28 is positioned as an appendage along at least one opposed side 26 of valve body 12. Referring to FIG. 3, floats 28 are preferably positioned along both sides 26. Float 28 adds buoyancy to valve member 20, such that valve member 20 floats into the closed position in the presence of a backflow. Valve member 20 may be made from buoyant material itself, in which case it may not be necessary to provide floats 28. However, it may be desired to enhance the buoyancy of valve member 20 by including other floats. By placing floats 28 on the side, it enables valve member 20 to be designed with a lower profile within valve body 12 than would otherwise be possible, as depicted in FIG. 7. Referring again to FIG. 1, the portion of float 28 at remote end 24 of valve member 20 preferably defines an inclined plane 30, such that the force of a backflow striking inclined plane 30 lifts valve member 20 toward the closed position. Referring to FIG. 6, inclined plane 30 may also be independent of float 28. For example, inclined plane 30 may be an outward extension of, or otherwise attached to valve member 20, with floats either positioned away from inclined plane 30 as shown, or not included on sides 26 of valve member 20. In some embodiments, where valve member 20 is sufficiently buoyant, it may not be necessary to include floats 28.

Referring to FIG. 1, a locking member 33 is positioned in hollow valve body 12, and is controlled by a handle 34. Locking member 33 is connected to handle 34 by connectors 39 that go around the outside of valve member 20 to avoid interfering with its operation. As shown in FIG. 3, connectors 39 are immediately adjacent to the inner wall of valve body 12, and may be positioned in channels 41 of valve body 12. As shown in FIG. 1, locking member 33 may also be positioned in a channel 41. Alternatively, valve body 12 could be designed with more clearance between valve body 12 and valve member 20 such that channels 41 would not be necessary. However, channel 41 is also useful in that it acts as a guide and support for locking member 33. It is preferable that connectors 39 be rigid to allow them to transmit upward and downward forces from handle 34 to locking member 33, although other designs may also be used. Referring to FIG. 1, locking member 33 has a release position below pivot axis 21 of valve member 20, in which valve member 20 is permitted to pivot freely between its open and closed positions. Referring to FIG. 2, locking member 33 also has a locked position immediately adjacent to valve member 20 that secures valve member 20 in the closed position. While the locked position is shown with locking member 33 half-way up valve member 20, it will be understood that position that allows locking member 33 to apply a sufficient closing force on valve member 20. As shown, handle 34, which is accessible from outside the top of hollow valve body 12, is pulled up to raise locking member 33 between the release position shown in FIG. 1 to the locked position shown in FIG. 2 and lowered again to move locking member 33 the release position. Handle 34 can also be used to lock valve body 20 when it is closed in the presence of water, and also to close valve body 20 in the absence of water, as locking member 33 is behind pivot axis 21. In the locking position, channels 41 prevent locking member 33 from moving backward and allowing locking member 33 to open. While locking member 33 is shown as a straight piece that extends across the entire width of valve body 20, it will be understood that this need not be the case. For example, locking member 33 can be any shape that will fit under valve body 20 in the open position, and may not extend across the entire width. For example, locking member 33 may be made up of two components that extend outward from each connector 39.

Figure 4:
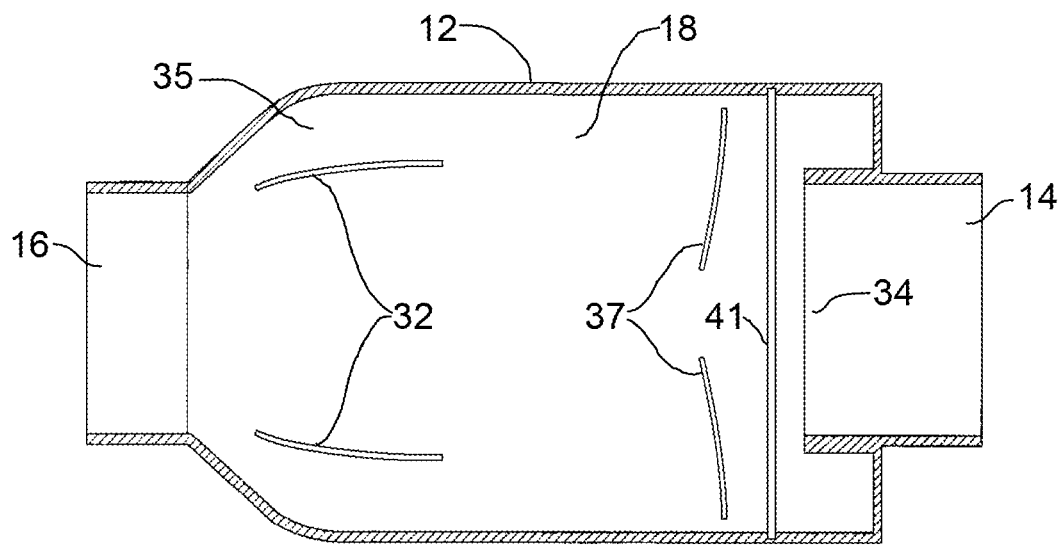
FIG. 4 is a top plan view of a variation of the low profile backwater valve with the valve body removed.
Figure 5:
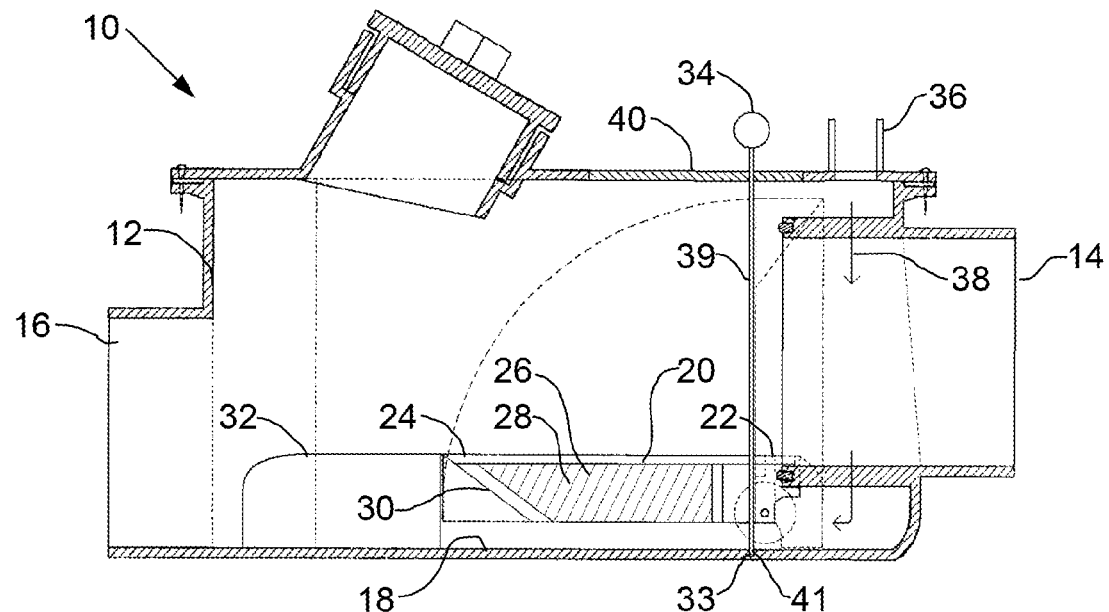
FIG. 5 is a side elevation view of a further variation of the low profile backwater valve.

It has been found that debris and other contaminants can cause difficulties in the operation of backwater valve 10. To counter this, certain features may be used. Referring to FIG. 4, baffles 32 may extend vertically from bottom 18 of valve body 12 to define flow channels 35 directing flow toward float 28. Referring to FIG. 5, a hose coupling 36 may be provided on valve body 12 with a passage indicated by arrows 38 to flush underneath valve member 20 to remove debris that might collect between valve member 20 and bottom 18 of valve body 12. Referring to FIG. 4, baffles or dams 37 extend vertically from the bottom of the valve body protecting the hinge end of the valve member from contamination. Alternatively, referring to FIG. 6, baffles 37 may extend from the bottom of valve body 20. In addition to baffles 32 and 37, valve member 20 may carry a seal 42 at remote end 24 to help prevent any debris carried by water from flowing under valve member 20. Referring to FIG. 5, valve body 12 may also have a transparent top 40 to facilitate visual inspection.

Operation:

Referring to FIGS. 1 and 3, low profile backwater valve 10 is installed to allow water to flow from inlet 14 to outlet 16. If the flow of water reverses to flow from outlet 16 to inlet 14, the flow is directed by baffles 32 toward inclined plane 30 on float 28. The flow against plane 30, as well as the buoyancy of floats 28, causes valve member 20 to rise and ultimately close to prevent flow out of inlet 14. The actual combination of these forces that closes valve member 20 will depend on the rate of flow of backwater. For example, if the rate of flow is high, the force of impact on inclined plane 30 may be sufficient to cause valve member 20 to close, or merely enough to lift valve member 20 partially. If the rate of flow is slower, the buoyancy of valve member 20 will cause valve member 20 to close.

Referring to FIG. 4, bottom 18 is contoured and provided with baffles 32 to direct the flow of water to close valve member 20 as well as baffles 37 to allow water that may carry debris and contaminants, such as dirt, to drain away from valve member 20 and hinge end 22. This helps prevent valve member 20 from accumulating debris between valve member 20 and bottom 18, or by causing hinge end 22 to become immobilized. Referring to FIG. 5, transparent top 40 allows a visual inspection of backwater valve 10. If it becomes apparent from a visual inspection or otherwise that valve member 20 is not operating properly, hose coupling 36 allows a cleaning fluid to be flushed through to clean backwater valve 10.

If it is desired to close and lock valve body 20, handle 34 is pulled away from valve body 12 as shown in FIG. 2, which causes locking member 33 to move upward and cause valve member 20 to pivot to the closed position (if not already closed), and stops in the locked position. Valve member 20 is released by pushing handle 34 downward, which causes locking member 33 to move downward such that it no longer impedes valve member 20 from pivoting between the open and closed positions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A low profile backwater valve, comprising:
   a hollow valve body having an inlet, an outlet, a top and a bottom;
   a pivoting valve member pivotally movable between a normally open position along the bottom of the valve body and a closed position sealing the inlet, the valve member having a hinge end that pivots about a pivot axis toward the bottom of the hollow valve body, a remote end, and opposed sides, the valve member being buoyant in water;
   characterised in that:
      a locking member is positioned in the hollow valve body, the locking member having a release position below the valve member when the valve member is in the normally open position that permits the valve member to pivot freely, and a locking position immediately adjacent to the valve member that secures the valve member in the closed position; and
      a handle is attached to the locking member and accessible from outside and from the top of the hollow valve body, the handle moving the locking member between the release position and the locking position when the handle is lifted.

2. The low profile backwater valve of claim 1, wherein the locking member is received in a channel in an inner surface of the hollow valve body in the release position.

3. The low profile backwater valve of claim 1, wherein connectors connect the handle to the locking member, the connectors being received in channels in an inner surface of the hollow valve body, the channels acting as guides to guide the locking member between the release position and the locking position.

* * * * *